United States Patent [19]

Klein

[11] Patent Number: 4,500,103
[45] Date of Patent: Feb. 19, 1985

[54] HIGH EFFICIENCY BICYCLE FRAME

[76] Inventor: Gary G. Klein, 207 B S. Prairie Rd., Chehalis, Wash. 98532

[21] Appl. No.: 849,141

[22] Filed: Nov. 7, 1977

Related U.S. Application Data

[63] Continuation of Ser. No. 658,620, Feb. 17, 1976, abandoned.

[51] Int. Cl.³ .............................................. B62K 19/06
[52] U.S. Cl. ................................................ 280/281 R
[58] Field of Search ............. 280/281 R, 281 LP, 274; 296/205

[56] References Cited

U.S. PATENT DOCUMENTS 3,966,230 6/1976 Nicol ............................... 280/281 R

FOREIGN PATENT DOCUMENTS 657011 9/1951 United Kingdom ............ 280/281 R

OTHER PUBLICATIONS

Bicycling Magazine, May 1975, pp. 26, 28, 30, 32, article "Design Considerations", by M. Rosenbaum.

Primary Examiner—David M. Mitchell
Attorney, Agent, or Firm—Jim Zegeer

[57] ABSTRACT

The frame of a racing type bicycle is made very rigid to increase the power transmission efficiency and to improve the handling and riding characteristics. The preferred configuration uses large diameter tubing in aluminum alloy to achieve a lighter, stronger and much more rigid frame than prior art.

7 Claims, 4 Drawing Figures

HIGH EFFICIENCY BICYCLE FRAME

This is a continuation of application Ser. No. 658,620 filed Feb. 17, 1976 for "A High Efficiency Bicycle Frame", now abandoned.

This invention relates to bicycle frames.

In prior art frames higher than normal rigidity acieved a harsh undesirable ride, while lower than normal rigidity caused significant power train deflection and energy loss. Prior art frames thus fell within a narrow rigidity range.

The objects of this invention are: First, to increase the power train efficiency by reducing frame deflection losses. Second, to achieve good handling and comfortable ride characteristics in this more efficient frame. Third, to improve the mechanical strength of the frame. Fourth, to decrease the mass of the frame.

For an understanding of the nature and objects of the invention reference should be had to the following detailed descriptions in conjunction with the accompanying drawings in which.

Figure 1:
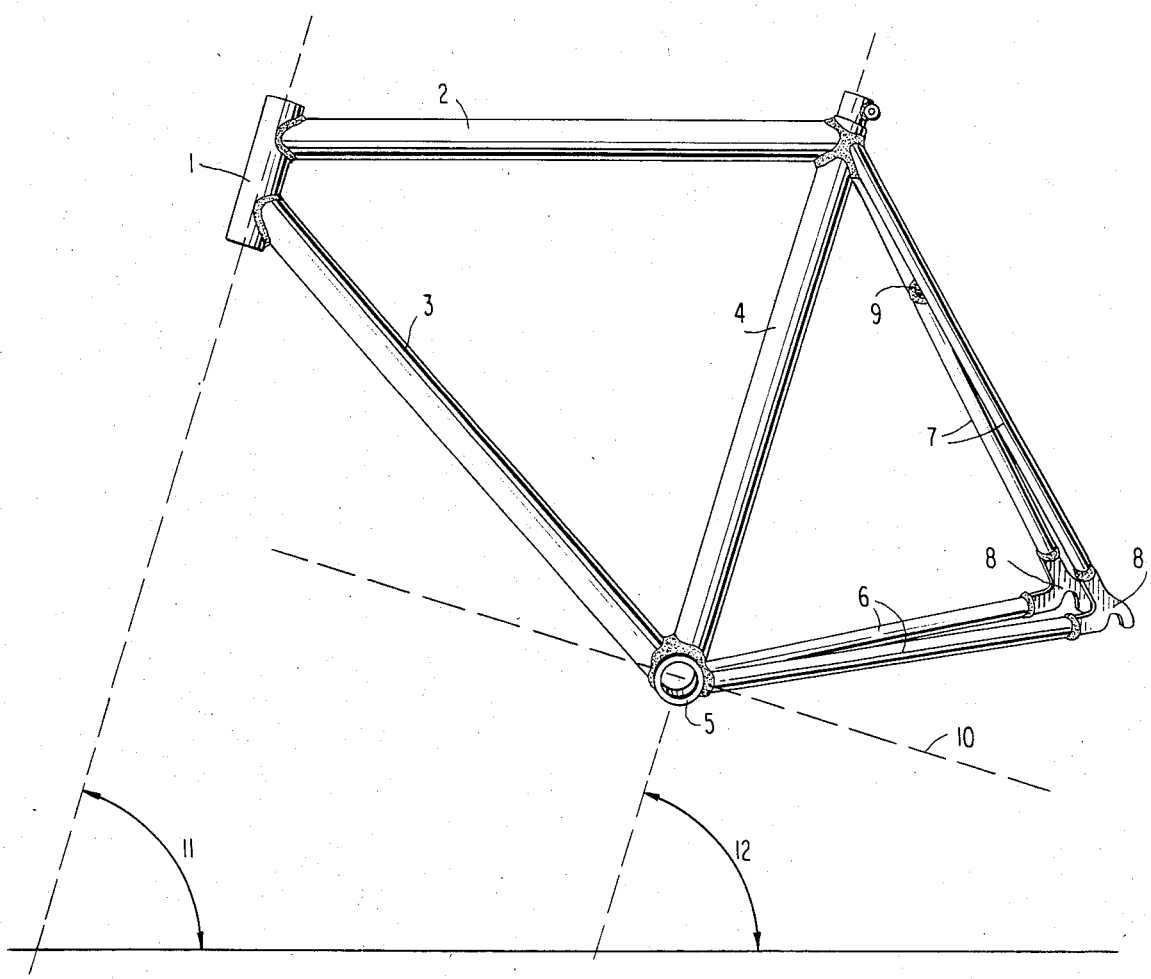
FIG. 1 is a side view of the invention.
Figure 2:
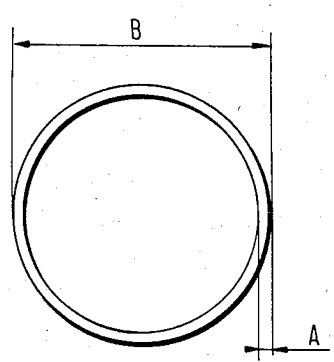
FIG. 2 is a cross sectional view of a typical frame tube.
Figure 3:
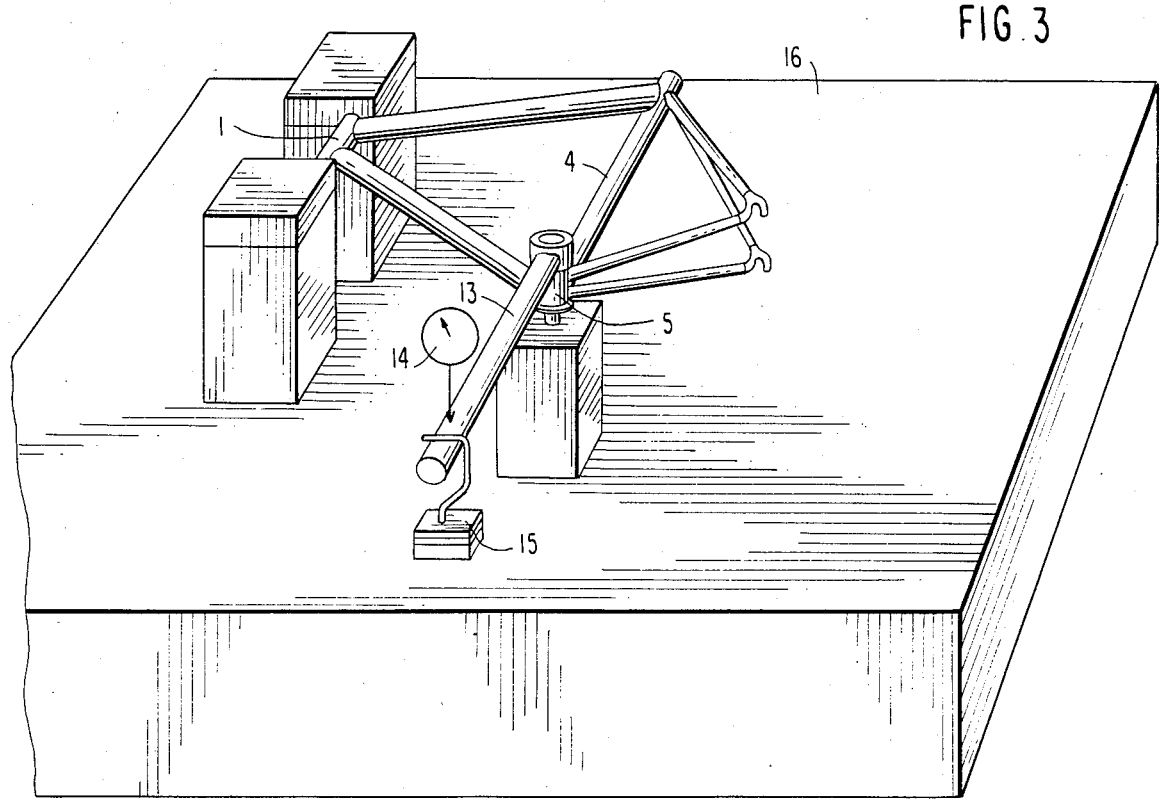
FIG. 3 is a perspective view of the Bottom Bracket Torsion Test.
Figure 4:
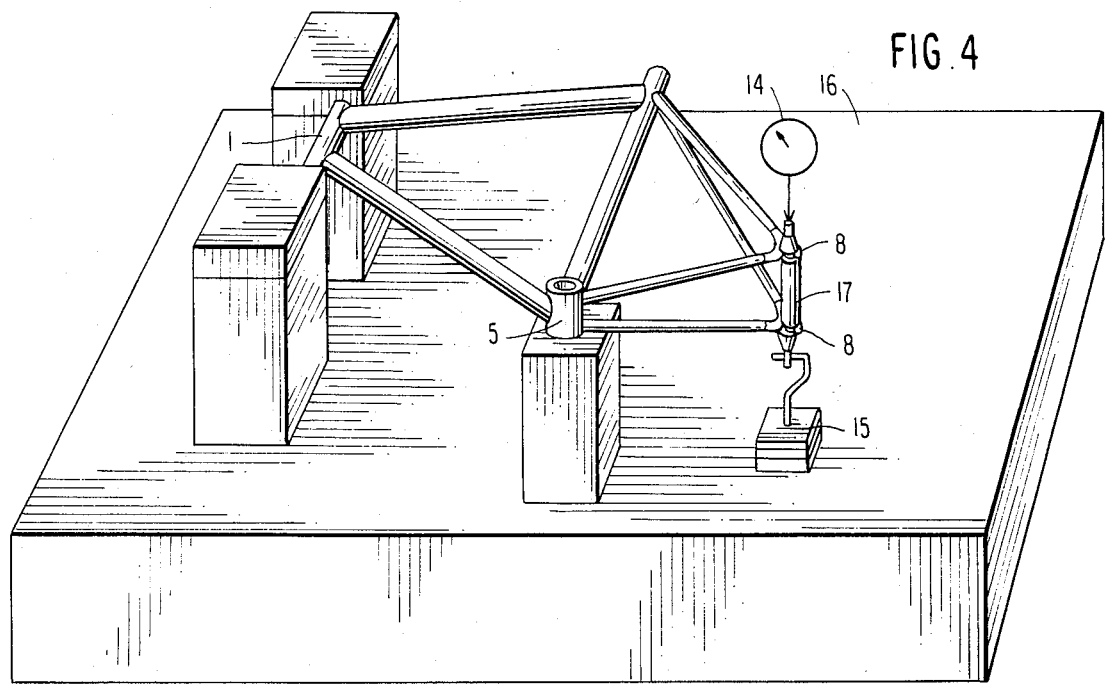
FIG. 4 is a perspective view of the Lateral Bending Stiffness Test.

Referring to the drawings, FIG. 1 shows a racing type bicycle frame for wheels greater than 25 inches in diameter. It consists of a head tube 1, a down tube 3, a seat tube 4, a bottom bracket sheel 5, two chainstay tubes 6, two seatstay tubes 7, two rear fork ends 8, and a seat-stay bridge 9. FIG. 2 shows a tube cross section having wall thickness A and exterior diameter B. FIG. 3 illustrates the Bottom Bracket Torsion Test. As shown, the bicycle frame is positioned horizontally on the test bed and the ends of the head tube 1 are securely clamped to the cast iron test bed 16. The torsion testing lever is securely bolted into the bottom bracket shell 5 and extends opposite the seat tube 4. As also shown on FIG. 3, the bottom bracket shell 5 is supported vertically but is not otherwise restrained. Weights 15 are applied to the torsion testing lever 13 and deflections are measured by the dial indicator 14. FIG. 4 illustrates the lateral Bending Stiffeness Test. As shown in FIG. 4, the bicycle frame is positioned horizontally on test bed 16 and both ends of head tube 1 are securely clamped to the cast iron test bed 16. The bottom bracket shell 5 rests on the test bed. The dummy rear axle 17 is clamped into the rear fork ends 8. Weights 15 are applied to the lower end of the dummy rear axle and the deflection is measured from the top by indicator 14.

The various parts of the frame are attached in a suitable manner so as not to lose strength or rigidity at the joints. The preferred configuration utilizes welded or brazed joints with subsequent heat treatment where applicable but lugs or other joining devices or means can be applied.

The frame is a critical member of the bicycle power train. When reciprocating pedalling force is applied to bicycle part of it is wasted in deflecting the frame. Bicycles behave like linear springs when deflected. As the frame is distorted energy is stored in it. The amount of energy stored is proportional to the deflection squared. If the frame is resisted as it returns to an unloaded condition work is done on the resisting force, i.e. the rider's legs. If the return is not resisted, and the frame is allowed to spring back freely, the work is lost as heat. Unfortunately, muscles can not reabsorb energy, so work put into the rider's legs is also lost as heat.

The two main types of frame deflection are: First, twisting of the frame between the head tube 1 and the bottom bracket shell 5 around an axis 10 as in FIG. 1 caused by the torque exerted through the handlebars and cranks during hard pedalling. Second, side (lateral) deflection of the bottom bracket shell 5 out of the main plane of the frame caused by the off center force applied during hard pedalling.

The bicycle frame does not deflect significantly in the following modes: First, there is little movement of the bottom bracket shell 5 toward or away from the rear cog (located between the rear fork ends 8). Second, the head tube 1 very rigidly resists movement toward or away from the bottom bracket shell 5. Third, the bottom bracket shell 5 rigidly resists twisting movement toward or away from the rear cog in the plane of the chainstay tubes 6.

It is relatively easy to twist a light tube, more difficult to bend it and very difficult to stretch or compress it. The three modes in which there are no significant deflections require tubing to stretch or compress. The two modes in which there are significant deflections require only bending and/or twisting of the tubes.

The Bottom Bracket Torsion Test is accomplished as follows: The frame is positioned horizontally on a test bed 16. A three-forths inch threaded rod is fastened into the head tube 1. The rod is clamped firmly to the test bed at both ends of the head tube 1, thereby securely and rigidly clamping head tube 1 at both of its end to test bed 16. The torsion testing lever 13 is bolted rigidly into the bottom bracket shell 5 and projects opposite to the seat tube 4. While the bottom bracket shell 5 rests firmly on elevated portion P of test bed 16, it is otherwise unrestrained and it remains free to twist. As shown in FIG. 4, during the measurement the frame has no additional equipment mounted on it nor is it restrained in any other way.

Deflection measurements are made by applying torque to the bottom bracket shell 5 by means of torsion testing lever 13 (which is exemplary premarked at 30.5 inches from the center of the bottom bracket shell 5) and the angular deflection of the bottom bracket shell 5 is measured by measuring the total angular deflection of the torsion testing lever and subtracting the deflection that occurs in the torsion testing lever 13 itself. The resultant bottom bracket torsion rigidity is calculated as torque expressed in foot-pounds$_{force}$, divided by angular deflection in degrees. In this example, the measurements were taken with four different lever preloads, each time measuring the deflection caused by adding three pound weights. Preloading (weight in addition to the weight of the torsion testing lever) takes up any residual play in the system. The four preloads are: (1) 0.0 pounds, (2) 5.0 pounds, (3) 10.0 pounds, and (4) 15.0 pounds. These measurements are compared against each other to assure accuracy. The least sensitive to operative error is the 15 pound preload which is used as the result. Cast iron test bed 16 weighs in excess of 100 tons to assure its rigidity and, hence, accuracy of measurement. As noted above, the deflection of the torsion lever itself is subtracted and in this example, the torsion testing lever deflects 0.02 inch with a 3.0 pound added load when the c clamp is fixed to a rigid structure so this 0.02 inch is subtracted from the deflection measurement on bottom bracket torsion frame test as a correction factor to determine how much the bottom bracket shell of the frame per se is deflected.

The lateral Bending Stiffness Test is accomplished as follows: As in the bottom bracket torsion test desribed above, the frame is positioned horizontally on a test bed 16 and the head tube 1 is clamped securely and rigidly at both ends to test bed 16 by means of a three-fourths inch threaded rod fastened into the head tube with the ends of the rod being clamped firmly to the test bed at both ends. The bottom bracket shell 5 rests firmly on the test bed 16 and as shown otherwise restrained. A solid dummy rear axle 17 is clamped into the rear fork ends 8. In the case of adjustable type rear fork ends 8 the dummy rear axle is positioned such as to make the wheelbase as short as possible. Deflection measurements are taken from the top of the dummy rear axle 17 with a 0.001 inch dial indicator 14. Weights are hung from the bottom of the dummy rear axle. Measurements are taken with four different preloads, each time measuring the deflection caused by adding a 30 pound weight. The four preloads (weights in addition to the weight of the dummy rear axle) are: (1) 0.0 pounds. (2) 5.0 pounds. (3) 10.0 pounds. (4) 15.0 pounds. The four measurements are compared against one another to assure accuracy. The least sensitive to operator error is the 15.0 pound preload which is used as the result. Thus, forces applied vertically downward along the axis of the rear axle and deflection along the axis is measured. The lateral bending rigidity is force is pounds$_{force}$ applied to the axle divided by the deflection in inches of the axle e.g. rigidity or stiffness is inversely proportional to the amount of deflection.

The seat clamp is not anchored during either the Bottom Bracket Torsion Test or the Lateral Bending Stiffness Test. The largest and most significant power train deflections usually arise in sprinting or hill climbing situations where the rider is usually out of the seat.

The Bottom Bracket Torsion Test measures in a straight forward manner the type of twisting movement that results in power loss.

The Lateral Bending Stiffness Test measures the out of plane deflection that results in power loss in a less direct manner. The direct method would be to clamp the head tube and clamp the solid dummy rear axle rigidly to the test bed. Weights would be applied to the bottom bracket and deflection would be measured. The Lateral Bending Stiffenss Test amplifies the amount of deflection (it is a more sensitive test) and is easier to set up and accomplish. The actual forces the frame sees are the same. The results can be correlated exactly to the results of the direct test.

The test bed 16 is made of cast iron and weighs in excess of 100 tons. The rigidity of the test bed is of great importance. A two inch thich solid hardwood table top woth clamping fixtures bolted to it solidly is not nearly rigid enough to give accurate or meaningful test results. The accuracy of the Bottom Bracket Torsion Test and Lateral Bending Stiffness Test is plus or minus 5%.

The relative amounts which each of the two types of deflection contribute to the total power train deflection varies with frame geometry and also depends on how the rider applies force. Some bicycle racers lean the bicycle into the powering leg as much as fifteen degrees in sprinting or hill climbing. This increases the importance of lateral bending stiffness. Some bicycle racers will not lean the bicycle as severely. As a result a total rigidity of the power train can not be objectively calculated. However, given the two stiffness data, frame geometry and bike lean a total rigidity of the power train can be objectively calculated. On the average the lateral bending deflection accounts for approximately 60% of the total power train deflection due to the frame. The torsional deflection accounts for the remainder.

Steel racing type bicycle frames have Bottom Torsion Test deflections between 0.072 inches and 0.095 inches and Lateral Bending Stiffness Test deflections between 0.026 inches and 0.04 inches. This results in a bottom bracket torsion rigidity of between 42 and 53 pounds$_{force}$ feet per degree and lateral bending rigidity of between 61 and 75 pounds$_{force}$ per inch. Racing type bicycle frames constructed of more exotic material such as titanium, carbon fiber composites or aluminum alloy have had Bottom Bracket Torsion Test deflection between 0.089 inches and 0.122 inches and Lateral Bending Stiffness Test deflections between 0.04 inches and 0.049 inches resulting in a bottom bracket torsion rigidity of between 33 and 45 pounds$_{force}$ feet per degree and lateral bending rigidity of between 61 an 75 pounds$_{force}$ per inch. The exotic type material bicycle frames have not enjoyed much competition use as they do not have sufficient power train rigidity.

The two main types of power train deflection are mostly the result of tosional and bending movements of the individual frame tubes. Accordingly, the torsional and bending rigidity of each frame tube has been increased where appropriate to increase the power train rigidity.

The top tube has bending force applied to it both when the bottom bracket twists and when the frame bends laterally. The preferred configuration uses 1.5 inch diameter 0.051 inch wall thickness aluminum alloy tubing to increase the bending rigidity. The down tube has both bending and torsion forces applied to it both when the bottom bracket twists and when the frame bends laterally. The preferred configuration uses 1.5 inches diameter 0.059 inch wall thickness aluminum alloy tubing to increase the bending and torsional rigidity. The seat tube has bending force applied to it when the bottom bracket twists. The preferred configuration uses 1.5 inch diameter 0.059 inch wall thickness aluminum alloy tubing to increase the bending rigidity. The chainstay tubes have torsional force applied to them when the bottom bracket twists and bending fore applied to them when the frame bends laterally. The preferred configuration uses 0.84 inch diameter 0.109 inch wall thickness aluminum alloy tubing to increase the torsional and bended rigidity. The seatstay tubes have bending force applied to them when the frame bends laterally. The preferred configuration utilizes 0.75 inch diameter 0.035 inch wall thickness aluminum alloy tubing to provide increased bending rigidity.

Test results for the Lateral Bending Stiffness Test was 0.025" deflection or less and for the Bottom Bracket Torsion Test, 0.06" deflection or less. To convert to terms which express the deflection results in terms or rigidity the Lateral Bending Rigidity is simply the force applied to the rear dropouts divided by the amount of their deflection. Thus, three pounds$_{force}$ divided by 0.025" deflection yields 120 pounds$_{force}$ per inch spring rate or rigidity. Because the results are inverted, a 0.025" or less deflection is the same as 120 pound$_{force}$ per inch or more. Less than 0.025" deflection would yield more than 120 pound$_{force}$ per inch rigidity.

To express the Bottom Bracket Torsion Test in terms of Torque/Angular deflection, which factors out such things as the length of the testing lever and other details of the test setup described above, the applied force, 3 pound$_{force}$ is expressed as an applied torque: 3 pound$_{force}$ times 30.5 inches moment arm is 91.5 pound$_{force}$ inches or 7.625 pound$_{force}$ feet. The measured deflection can also be expressed as an angular deflection. The angular deflection equivalent to a deflection of 0.06" in the test will be arcsine (0.06" divided by lever length 30") or 0.1146 degree. This yields a Torsion Rigidity of 66.54 pound$_{force}$ feet per degree. For simplicity, this number is rounded up to 67. Again, the rigidity is inverted with respect to the deflection measurement, so 0.06" or less becomes 67 or greater.

Thus, the improvement according to the present invention with the top, down, seat, chainstay, and seatstay tubes having the diameter wall-thickness ratios of less than 50 and the preferred diameter and wall-thickness of the frame tubing as given hereinabove, has a lateral bending rigidity of at least 120 pound$_{force}$ per inch and a bottom bracket torsion rigidity of at least 67 pound$_{force}$ per degree. This high degree of stiffness coacting with the light weight produces a bicycle frame which has suprisingly high power train efficiency, good handling and riding characteristics heretofore unachievable in light weight bicycle frames of the character herein disclosed.

Symbols are used to represent the physical features in the following manner:

A is the wall thickness of a frame tube in inches as in FIG. 2.

B is the outside diameter of a frame tube in inches as in FIG. 2.

D is the density if the material in pounds mass per cubic inch.

$E_t$ is the tensile modulus of elesticity in the material in psi.

$E_s$ is the modulus of rigidity of the material in psi.

$T_y$ is the tensile yield strength of the material in psi.

$T_f$ is the tensile fatigue or endurance limit strength of the material for fully reversed stress in psi.

BRT is the relative bending rigidity of a frame tube.

TRT is the relative torsion rigidity of a frame tube.

WT is the relative weight of a frame tube.

SRT is the suspension rigidity or axial rigidity of a frame tube.

YST is the relative yield strength of a frame tube in bending.

FST is the relative fatigue or endurance limit strength of a frame tube in bending.

The relative rigidity of a frame tube in bending or torsion can be described by $E_t \times (B^4 - (B-2A)^4)$ which is designated as BRT for bending and $E_s \times (B^4 - (B-2A)^4)$ which is designated as TRT for torsion. The preferred configuration power train rigidity has been increased by roughly a factor of two over prior art. As a result, the power train efficiency is significantly increased.

The riding comfort or "ride" of a frame is influenced by many factors. Among thses are frame weight, frame geometry and the frame rigidity in suspension modes.

Light mass is desireable in a bicycle. A light bicycle requires relatively low energy to accelerate and maneuver. It makes hills easier to climb. Also, a large portion of the suspension of the total mass of the bicycle and rider occurs in the rider's arms, legs ans seat. These are particularly effective as low frequency, large movement suspension members. Thus light bicycle mass effectively increases the traction and road holding ability of the bicycle. The relative weight of a typical frame tube can be described by $D \times (B^2 - (B-2A)^2)$ which is designated as WT. The preferred configuration results in a frame weight saving of 25% over the best prior art (best prior art defined as prior art which is generally accepted as best).

The frame geometry is constrained by three factors: First, the rider must be in a low wind resistance high power output position. Second, the handling characteristics are influenced by the frame geometry and must be designed for. Third, the components of the bicycle must be correctly aligned to fit and function properly. Within these constraints frame geometries can be designed which will exhibit small but important differences in handling and "ride". The preferred configuration results in the angle between the head tube 1 and the ground surface ranging between 73 and 75 degrees and the angle 12 between the seat tube 4 and the ground surface ranging between 73 and 74 degrees. The ground surface is positioned as it will be when appropriate wheels and front fork are installed.

The main suspension modes of the frame result in tension, compression and bending of the frame tubes. The most important suspension members are the seat stay tubes. The relative stiffness of a frame tube along its axis can be described by $E_t \times (B-2A)^2$ which is designated as SRT. The preferred configuration of seatstay tubes utilizes 0.75 inch diameter 0.035 inch wall thickness aluminum alloy tubing and decreases the suspension mode stiffness about one-third resulting in a smoother ride.

The combined effect of the described factors produce a bicycle frame which achieves both high power train rigidity and good handling and riding characteristics.

Bicycle frames must be of sufficient strength to endure the high stresses placed upon them. Prior art racing type bicycle frames when they do fail usually fail by causing the frame tubes to bend. The relative yield strength of a typical frame tube in bending can be described by $T_y \times (B^3 - (B-2A)^3)$ which is designated as YST. This type of failure is usually the result of a crash or collision which unfortunately are not rare occurances, especially in competition conditions. The most common failures occur in the top tube and the down tube. The preferred configuration increases the yield strength of the frame.

Less frequent, but significant are fatigue failures. Here too, the most critical is the bending strength, particularly in the down tube. The relative fatigue strength of a typical frame tube in bending can be described by $T_f \times (B^3 - (B-2A)^3)$ which is designated as FST. The preferred configuration increases the fatigue strength of the frame.

The invention is a product of two separate developments. The first was the ability to create higher rigidity and strength in a frame while reducing the weight. Top quality steel racing frames are generally made of a relatively high strength steel alloy with the particular feature that torch brazing does not drastically effect it. Reynolds 531 which is the best known quality frame tubing, has a Modulus of Elasticity $E_t$ of 30,000,000 psi, a Modulus of Rigidity $E_s$ of 11,200,000 psi, a density D of 0.283 pound$_{mass}$ per cubic inch, a tensile yield strength of 112,000 psi, and a tensile fatigue strength of 32,500 psi. After brazing the tensile yield strength drops to 67,00 psi. This is high enough such that frames are used as brazed, without heat treatment. The tubes are so made as to have larger wall thicknesses at the brazed joints to reinforce the portions of the tube which lose part of their temper during brazing.

The preferred configuration uses an aluminum alloy such as 6061 T6. It has properties such as a Modulus of Elasticity $E_t$ of 10,000,000 psi, a Modulus of Rigidity $E_s$ of 3,8000,000 psi, a density of D of 0.098 pounds$_{mass}$ per cubic inch, a tensile yield strength of 40,000 psi, and a tensile fatigue strength of 14,000 psi. By heat treating the frames after welding, essentially full strength is restored. At a casual glance it is lighter, but it is not as stiff or as strong as steel. The higher rigidity of the invention comes from the special configuration of tubing chosen in conjunction with the natural properties.

As an example the strongest and most rigid double butted down tube made of Reynolds 531 has an outer diameter B of 1.125 inches and a wall thickness A of 0.028 inches in the main section and 0.04 inches at the ends. The relative bending rigidity of the main section compared to the preferred comfiguration is then $30,000,000 \times (1,125^4 - (1.125 - 2 \times 0.028)^4)/10,000,000 \times (1.5^4 - (1.5 - 2 \times 0.059)^4)$ which equals 0.63. The steel tube in the main section has only 63% of the bending rigidity of the aluminum tube. The relative torsional rigidity of the main section compared to the aluminum tube is then $11,200,000 (1.125^4 - (1.125 - 2 \times 0.028)^4)/3,800,000 \times (1.5^4 - (1.5 - 2 \times 0.059)^4)$ or 0.62. The main section of the steel tube has only 62% of the torsional rigidity of the aluminum tube. The relative weight of the main section of the steel tube compared to aluminum is $0.283 \times (1.125^2 - (1.125 - 2 \times 0.028)^2)/0.098 \times (1.5^2 - (1.5 - 2 \times 0.059)^2)$ or 1.04. The light guage portion of the steel tube is 4% heavier than the straight guage aluminum tube. The relative bending yield strength of the steel tube after brazing in the reinforced section compared to the aluminum tube is $67,000 \times (1.125^3 - (1.125 - 2 \times 0.04)^3)/40,000 \times (1.5^3 - (1.5 - 2 \times 0.059)^3)$ or 0.64. The steel tube in its heavy section has only 64% of the bending yield strength of the aluminum tube. The bending fatigue strength of the reinforced section of the steel tube compared with the aluminum tube is $32,500 \times (1.125^3 - (1.125 - 2 \times 0.04)^3)/14,000 \times (1.5^3 - (1.5 - 2 \times 0.059)^3)$ or 0.89. The bending fatigue strength of the steel tube is only 89% of the strength of the aluminum tube. This example shows how it is possible to obtain higher rigidity, higher strength and lower weight than prior art. While it might seem that the same results could be achieved by using larger diameters with thinner walls in steel, it is not practical to use tubing with a diameter/wall thickness of over 50. At this point tubes become prone to crippling failure and the strengths described above no longer apply. The lighter guages of steel down tubes are already near this engineering ratio, in fact some are slightly in excess of it. Thus, there is a limit to how far a the diameter of the tube can be increased with a given material within a given weight.

The preferred configuration uses aluminum alloy because it is less dense than steel and can be utilized in larger diameters without an increase in weight and remain within the diameter/wall thickness enginerring limit. It also has the advantages of low cost, availability, established welding techniques, corrosion resistance good machineability, and it is not brittle. However, the invention is not limited to aluminum alloy but could be constructed of other materials such as beryllium alloys, titanium alloys, magnesium alloys, or composites of other materials including such materials as glass fibers, carbon fibers, high strength plastic fibers, boron fibers, aluminum oxide fibers, or silicon carbide fibers.

The second developement was the realization of desirable "ride" and handling properties with a very stiff power train. Previously, power train rigidity has been equated with harsh ride. In *Top Tubes* by Reynolds Tube Co. Ltd. of Birmingham, England they write "If your frame is too rigid, it will transmit every vibration, every bump, from the road into your poor aching body; it will fight you on every bend of the way; it will drag you back on every hill." The invention, through a combination of light frame weight, improved suspension characteristics, and increased power train rigidity has achieved a combination of "ride", handling and powertrain efficiency that is a breakthrough in frame design.

The invention further comprises the balance of the bicycle (not shown) which is of conventional form and which comprises a fork, head set, wheels, pedals, pedal cranks connecting the pedals to the crank axle, handlebars, and drive chain drivingly connected between the crank axle and rear wheel, all of conventional form (also not shown).

It will now be apparent to those skilled in the art that other variations may be made within the scope of the invention. It is therefore intended that the above disclosure shall read as illustrative.

What is claimed is:

1. In a bicycle having wheels of greater than 25 inches diameter and a frame of the type including a tubular top tube having front and rear ends, a tubular seat tube having top and bottom ends with the top end secured to the rear end of said top tube, a tubular head tube having top and bottom ends with the top end secured to the front end of said top tube, a tubular down tube having top and bottom ends with the top end secured to the bottom end of said head tube, a pair of chainstay tubes having front and rear ends, two or more bridged seatstay tubes having top and bottom ends with the top ends secured to the top end of said seat tube, a bottom bracket secured to the lower ends of said seat and down tubes and the forward ends of said chainstay tubes, two rear fork ends secured to the rear and lower ends, respectively, of said chainstay and seatstay tubes, the head tube being at a ground angle of between 60 to 80 degrees and the seat tube to ground angle is between 58 and 85 degrees when the appropriate front fork and wheels are attached and rest on the ground, the mass of the frame without fork or other equipment is less than 5 pounds, the improvement wherein said top, down, seat, chainstay tubes and seatstay tubes have diameter to wall thickness ratios of less than 50, and are of a diameter and wall thickness such that said frame has a torsional rigidity between the said head tube and bottom bracket of at least 67 pounds$_{force}$ feet per degree of deflection with the said torque being applied to the bottom bracket along an axis normal to the axis of the said seat tube and normal to the axis of the said bottom bracket, and a lateral bending rigidity of at least 120 pounds$_{force}$ per inch of delfection measured at the said rear fork ends of the bicycle frame with an axle installed, with the said head tube clamped immovably in a horizontal position and the said bottom bracket supported but not otherwise restrained, said force being applied and deflection measured in a direction normal to the plane of the bicycle frame and along the axis of the rear axle.

2. The invention defined in claim 1 wherein said bicycle frame is made of an aluminum alloy and wherein said top tube has a diameter of at least about 1.5 inches and a wall thickness of about 0.051 inches, said down tube and said seat tube each have diameters of at least about 1.5 inches and a wall thickness of about 0.059 inches, said chainstay tubes have diameters of at least about 0.84 inches and wall thicknesses of about 0.109 inches and said seatstay tubes have a diameter of at least about 0.75 inches and a wall thickness of about 0.035 inches.

3. A bicycle frame in accordance with claim 1 wherein the seatstay tubes individually have axial rigidity represented as the cross sectional area of the tube material times the Modulus of Elasticity of the tube material of less than 1,000,000 pounds$_{force}$, a mass of less than 0.0095 pounds$_{mass}$ per inch of length, a bending yield strength represented as the outer radius cubed minus the inner radius cubed all times the yield strength of the tube material larger than 600 pounds$_{force}$ inches and a bending rigidity represented as the outer radius to the fourth power minus the inner radius to the fourth power all times the Modulus of Elsasticity of the tube material larger than 220,000 pounds$_{force}$ inches squared.

4. A bicycle frame in accordance with claim 1 in which the chainstay tubes individually have a bending rigidity represented as the outer radius to the fouth power minus the inner radius to the fourth power all times the Modulus of Elasticity of the tube material larger than 750,000 pounds$_{force}$ inches squared.

5. A bicycle frame in accordance with claim 1 in which the down tube and seat tube individually have a bending rigidity represented as the ouer radius to the fourth power minus the inner radius to the fourth power all times the Modulus of Elasticity of the tube material larger than 2,800,000 pounds$_{force}$ inches squared, in which the down tube and seat tube individually have a torsional rigidity about their axes represented as the outer radius to the fourth power minus the inner radius to the fourth power all times the Modulus of Rigidity of the tube material larger than 850,000 pounds$_{force}$ inches squared.

6. A bicycle frame in accordance with claim 1 in which the top tube has a bending rigidity represented as the outer radius to the fourth power minus the inner radius to the fourth power all times the Modulus of Elasticity of the tube material larger than 2,000,000 pounds$_{force}$ inches squared.

7. In a rigid light weight bicycle frame having wheels of greater than 25 inches diameter and an aluminum alloy frame of the type including a tubular top tube having front and rear ends, a tubular seat tube having top and bottom ends with the top end secured to the rear end of said top tube, a tubular head tube having top and bottom ends with the top end secured to the front end of said top tube, a tubular down tube having top and bottom ends with the top end secured to the bottom end of said head tube, a pair of chainstay tubes having front and rear ends, two or more bridged seatstay tubes having top and bottom ends with the top ends secured to the top end of said seat tube, a bottom bracket secured to the lower ends of said seat and down tubes and the forward end of said chainstay tubes, two rear fork ends secured to the rear and lower ends, respectively, of said chainstay and seatstay tubes, the improvement wherein said top, down, seat, chainstay tubes and seatstay tubes have diameter to wall thickness ratios of less than 50 and wherein at least one of said chainstay tubes have a diameter of at least about 0.084 inches and at least one of said seatstay tubes have a diameter of at least about 0.75 inches and said top, down, seat tubes have tube diameters and thickness such that the torsional rigidity between said head tube and bottom bracket is at least 67 pounds$_{force}$ feet per degree of deflection with the torque applied to the bottom bracket along an axis normal to the axis of said seat tube and normal to the axis of said bottom bracket and a lateral bending rigidity of at least 120 pounds$_{force}$ per inch of deflection measured at said rear ford ends with an axle installed and when the said head tube is clamped immovably in a horizontal position and said bottom bracket is supported vertically but not otherwise restrained.

\* \* \* \* \*

UNITED STATES PATENT AND TRADEMARK OFFICE
CERTIFICATE OF CORRECTION

PATENT NO. : 4,500,103

DATED : February 19, 1985

INVENTOR(S) : Gary G. Klein

It is certified that error appears in the above-identified patent and that said Letters Patent is hereby corrected as shown below:

Column 1, line 33, correct the spelling of "shell".
Column 1, line 47, correct the spelling of "stiffness".
Column 2, line 67, delete "c".
Column 3, line 55, correct the spelling of "thick".
Column 3, line 56, correct the spelling of "with".
Column 4, line 22, correct the spelling of "and".
Column 4, line 61, correct the spelling of "of".
Column 5, line 11, "0.1146" should be ".1146".
Column 5, line 61, correct the spelling of "these".
Column 5, line 67, correct the spelling of "and".
Column 7, line 58, delete "a".
Column 7, line 63, correct the spelling of "engineering".
Column 8, line 7, change "has" to --had--.
Column 8, line 62, correct the spelling of "deflection".

UNITED STATES PATENT AND TRADEMARK OFFICE
CERTIFICATE OF CORRECTION

PATENT NO. : 4,500,103                          Page 2 of 2

DATED      : February 19, 1985

INVENTOR(S): Gary G. Klein

It is certified that error appears in the above-identified patent and that said Letters Patent is hereby corrected as shown below:

Claim 7, line 39, correct the spelling of "fork"

Signed and Sealed this

Twenty-ninth Day of October 1985

[SEAL]

Attest:

DONALD J. QUIGG

Attesting Officer

Commissioner of Patents and
Trademarks—Designate